Oct. 3, 1967  B. O. HARTWIG  3,345,081

TRAILER DOLLY

Filed Oct. 12, 1965

BERNARD O. HARTWIG

BY *A. Richard Koch*

AGENT 3,345,081
TRAILER DOLLY
Bernard O. Hartwig, Rte. 1, Box 33, Tomahawk,
Wis. 54487
Filed Oct. 12, 1965, Ser. No. 495,147
6 Claims. (Cl. 280—476)

ABSTRACT OF THE DISCLOSURE

A dolly supporting the front end of a long trailer and forming a connecting link between the trailer and a towing vehicle to stabilize movement of the trailer. Resilient means absorb shocks inherent in starting, stopping, going over bumps and blowing tires.

---

This invention concerns an improvement in dollies used to support the front of long trailers when being towed by automobiles and the like.

When a two-wheeled trailer is pulled by an automobile, the front end weight of the trailer is supported by the automobile, causing a redistribution of weight on the wheels of the automobile and so affecting the braking and steering thereof. If the trailer is long, the effect is exaggerated. There is a tendency when a caster type dolly is employed under the front end for the trailer to swing from side to side and to swerve when a tire blows out. All of these troubles are avoided by this invention.

It is the primary object of this invention to improve upon the safety of automobiles towing trailers. One object is to provide means for stabilizing movement of a trailer. It is an object of this invention to provide a dolly that will improve upon the steering and braking of automobiles towing trailers. Another object is to provide a dolly for the front end of trailers that will prevent swerving when a tire blows. A further object is to provide a dolly reducing the shock to trailer and contents involved in starting, stopping and going over bumps. An additional object is to reduce the shock on the automobile in starting and stopping and in pulling the trailer over bumps.

Usually we think of a dolly as being wheeled, but there is no reason why endless tracks, skis, pontoons or other means of support could not be substituted for wheels when appropriate for moving over a supporting surface. In like manner, any type of tractor could be employed instead of an automobile, and the trailer need not be wheeled. The wheeled dolly used with a wheeled trailer towed by an automobile is used herein as an example of a preferred construction only and is not intended to limit the scope of the invention. By way of illustration, in the drawings.

Figure 1:
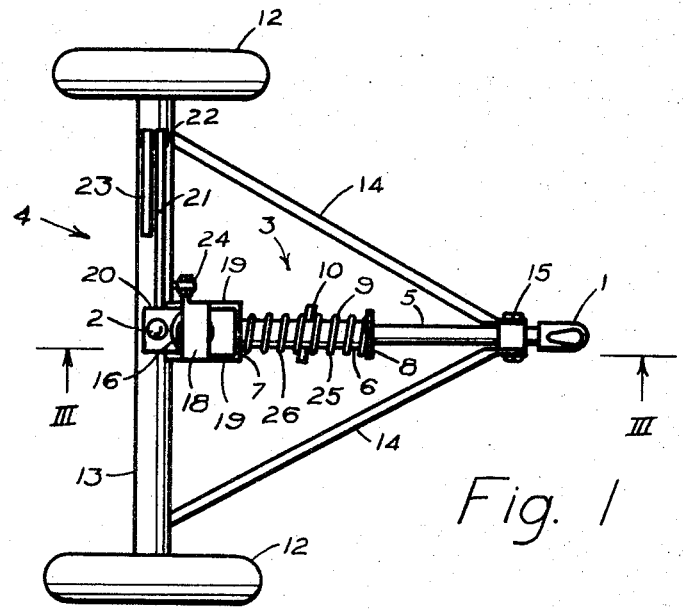
FIG. 1 is a plan view of the dolly.
Figure 2:
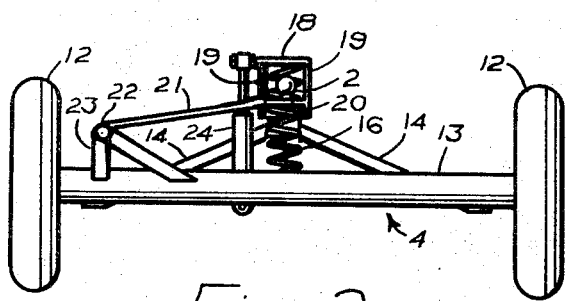
FIG. 2 is a rear elevation of the dolly showing the support mechanism.
Figure 3:
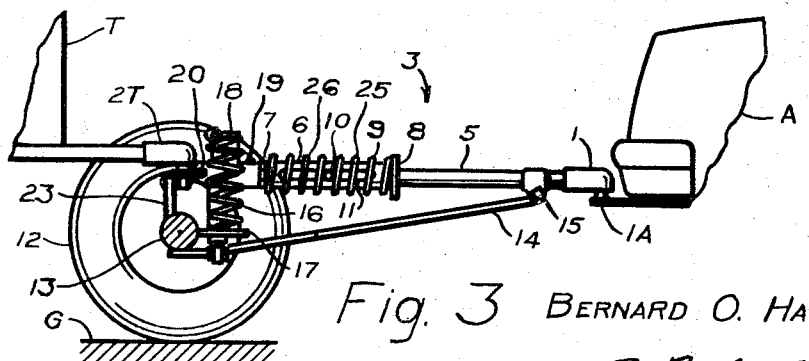
FIG. 3 is an elevation, partially in section substantially along line III—III, showing the dolly connected between an automobile and a trailer.

As shown in the drawings, the dolly has a conventional and well known socket portion 1 of a hitch, adapted to receive a ball portion (not shown) of a hitch 1A fastened in any of a variety of well known ways to the rear end of the automobile A, and a ball portion 2 of a hitch, adapted to be received in a socket portion of a hitch 2T, similar to socket 1, attached to the front of a trailer T in conventional and well known manner. The details of the socket are not a part of this invention and are omitted from this description. The socket 1 and ball 2 are attached to opposite ends of a draft mechanism 3, the ball end of which is mounted on a wheeled support mechanism 4, tied to the socket end 1 to permit easy movement of the dolly over the ground G. Draft mechanism 3 contains a draw bar 5, rigidly connected to socket 1, reciprocable axially in a tube or guide 6, rigidly connected to ball 2. Fixed retainers or flanges 7 and 8 on respective ends of tube 6 retain a spring 9 on the tube. A pin or projection 10, fixed on bar 5, passes through at least one elongated axial slot 11 in tube 6 and engages spring 9 intermediate its ends to form a resilient connection between the telescoping bar 5 and guide 6. Other details of the draft mechanism will be disclosed later. In the support mechanism 4, wheels 12 are mounted for rotation on opposite ends of an axle or crossbar 13, connected by rigid tie bars or links 14 to a pivot 15 affixed to bar 5 so that axle 13 is moved forwardly or backwardly by movement of bar 5. A vertical spring 16, resting on a seat 17, rigid with axle 13, supports the ball end of draft mechanism 3 at support 18, so that the ball 2 is directly above the axle 13. Support 18 is connected to sides 19 passing on opposite sides of vertical spring 16 and rigidly connecting guide 6 to the mounting means 20 for ball 2. A stabilizing bar 21, connected (rigidly or pivotally) at one end to mount 20, pivots at the other end on a swivel joint 22, rigidly connected to a bracket 23 on axle 13 at a point remote from the ball 2. A conventional automobile type shock absorber 24 acts between axle 13 and support 18.

In operation the front end of a trailer T is connected to the dolly by socket portion 2T of a hitch on the trailer mating with the ball portion 2 on the dolly, so that the front end of the trailer is movable with the dolly, the front end weight of the trailer being carried by the ball 2 directly above the axle 13 and partially compressing spring 16, so that the front end weight is sprung weight on the axle 13 only and is free to move vertically within limits imposed by the spring 16 and the shock absorber 24 as the wheels 12 roll over obstructions on the ground G, the spring imposing a restraint on downward motion by resilient compression and the shock absorber restraining upward motion in conventional manner. Stabilizer 21, in pivoting around the swivel joint 22 as the trailer moves vertically with respect to the axle 13, substantially prevents lateral motion of the trailer, since the bar 21 is long compared to the vertical excursion. When hitch portion 1 is secured to a mating portion 1A on a towing vehicle A, the dolly is moved forward and backward and turned by said vehicle, since the wheel and axle assembly is connected to the hitch portion 1 by the ties 14 and the bar 5. It will be noted that the towing vehicle A only supports a small part of the weight of the dolly's draft mechanism, all other weight being carried by the axle 13 and wheels 12. The hitch portion 2, to which the trailer is attached, has some freedom of motion forward and backward with respect to the drawbar 5 due to the resilient connection between bar 5 and guide 6. When the towing vehicle A moves forward, the drag created in pulling the trailer T tends to stretch the draft mechanism 3. What actually happens is that the pull exerted by the automobile on the hitch portion 1 is transmitted through drawbar 5 and pin 10 to spring 9, while the drag exerted by the trailer on the hitch portion 2 is transmitted through support 20, sides 19, guide 6 and flange 8 to spring 9. Since these forces acting on that part 25 of spring 9 between pin 10 and flange 8 are directed toward each other, the part 25 is compressed in proportion to the forces acting upon it. The same effect occurs when the towing vehicle accelerates in a forward direction or decelerates in a backward direction due to the inertia of the trailer. When the towing vehicle moves backward, the push is transmitted from hitch portion 1 through drawbar 5 and pin 10 to spring 9, while the drag of the trailer is transmitted through hitch portion 2, support 20, sides 19, and flange 7 to spring 9. Since these forces are acting toward each other on that part 26 of spring 9 between pin 10 and flange 7, the part 26 is compressed in proportion to the forces acting upon it. Similar effects occur due to the inertia of the trailer when the towing vehicle accelerates rearwardly or decelerates forwardly.

The additional set of wheels supporting the front end weight of the trailer, and the resilient draft mechanism make the driving of a vehicle towing a trailer much safer and easier because the weight on the wheels is not changed.

It is to be understood that there are other types of hitches and resilient members, that parts 25 and 26 of spring 9 could be separate springs, that guide 6 and bar 5 could be transposed, that other types of stabilizers could be employed, and that many changes in details could be made within the scope of this invention, which is limited only by the claims.

I claim:

1. A dolly for use in towing a trailer behind a tractor comprising first and second members telscoping one within the other, a projection on the inner of said members extending through a longitudinal slot in the outer of said members, a retainer on said outer member, first resilient means interconnecting said projection and said retainer to permit limited longitudinal motion between said members, a first hitch portion rigid with said first telescoping member adapted to be connected to a mating hitch portion on said tractor, a second hitch portion rigid with the second telescoping member adapted to be connected to a mating hitch portion on the trailer, a crossbar adjacent said second member, rigid connecting means between the crossbar and said first member, second resilient means acting between the crossbar and said second member to permit limited vertical motion of said second member, a stabilizing link connecting said second member to a remote point on the crossbar to limit lateral movement of said second member, and support means attached to the crossbar to permit easy movement of said dolly over a supporting surface.

2. In a trailer dolly, first and second members telescoping one within the other, a projection on one of said members extending through a longitudinal slot in the other of said members, a retainer on said other member, first resilient means interconnecting the projection and said retainer to permit limited motion between said members, a first hitch portion on said first member adapted for connection to a tractor, a second hitch portion on the second member adapted for connection to a trailer, a crossbar beneath said second hitch portion, rigid links between the crossbar and the first member, a second resilient means acting to limit vertical motion between the crossbar and said second hitch portion, means to substantially prevent lateral movement of said second portion, and support means for said crossbar.

3. A dolly for use in towing a trailer behind an automobile comprising first and second elongated telescoping members, a projection on one of said members extending through a longitudinal slot in the other of said members, a retainer on said other member, first resilient means interconnecitng the projection and said retainer to permit limited longitudinal motion between said members, a first hitch portion on said first member adapted for connection to the automobile, a second hitch portion on said second member adapted for connection to and support of a portion of the trailer, an axle beneath said second hitch portion and perpendicular to said telescoping members, rigid means connecting the axle to said first member, second resilient means acting between the axle and said second member to limit vertical motion therebetween, means restraining lateral motion between the axle and said second member, and wheels mounted for rotation on the ends of said axle to permit easy movement of said dolly over a supporting surface.

4. A dolly for use in towing a trailer behind an automobile comprising a drawbar having a first end reciprocable in a guide, a projection on said first end extending through a longitudinal slot in the guide, a pair of spaced retainers on said guide bracketing the projection, first and second resilient means acting between said projection and the respective retainers, a first hitch portion on a second end of the drawbar, a second hitch portion on said guide, an axle beneath the second hitch portion, wheels rotatable on respective ends of the axle, rigid connecting links between the axle and said drawbar, a third resilient means acting between the axle and said second hitch portion, and means limiting lateral movement of said second hitch portion, whereby the second hitch portion may have restrained longitudinal and vertical but substantially no lateral motion.

5. A dolly as in claim 4 in which the third resilient means comprises a compression spring and a shock absorber connected in parallel.

6. In combination in a trailer dolly, an axle, wheels mounted for rotation on respective ends of the axle, a drawbar having first and second ends, a first hitch portion adapted for connection to a towing automobile affixed to said first end, rigid links connecting the axle to said drawbar at a remote point adjacent said first end so that the wheeled axle is normal to the drawbar and follows in fixed relation behind said automobile, a tube receiving the second end of said drawbar for reciprocation therein, first and second flanges on respective ends of said tube, diametrically opposite longitudinal slots in the tube, a pin movable with the second end of the drawbar passing through and extending beyond said slots, first and second coiled springs surrounding the tube and partially compressed between said pin and the respective flanges to provide for limited resilient longitudinal motion between the drawbar and said tube, a second hitch portion rigid with said tube above said axle adapted to couple a trailer to the dolly, a third coil spring in partial compression acting between the axle and said second hitch portion to resiliently support the second hitch portion above said axle, a shock absorber acting between said second hitch portion and the axle to restrain separation therebetween, and a long substantially horizontal stabilizer bar connecting said second hitch portion to a pivot at a fixed point above a remote position on said axle at substantially the height of said second hitch portion so that lateral movement of the second hitch portion is limited.

References Cited

UNITED STATES PATENTS

| 2,381,190 | 8/1945 | Tiner et al. | 280—476 |
| 2,444,305 | 6/1948 | Milhizer | 280—487 X |
| 2,550,083 | 4/1951 | Pazdernik | 280—487 |
| 2,733,931 | 2/1956 | Reid et al. | |
| 2,783,039 | 2/1957 | Wilson | 280—486 X |

FOREIGN PATENTS 215,401   12/1957   Australia.

LEO FRIAGLIA, *Primary Examiner.*